United States Patent [19]

Samour et al.

[11] 4,213,486

[45] Jul. 22, 1980

[54] COATED PIPE AND PROCESS FOR MAKING SAME

[75] Inventors: Carlos M. Samour, Wellesley; Earl G. Jackson, Bedford; Samuel J. Thomas, Hamilton, all of Mass.; Louie E. Davidson, Londonberry, N.H.

[73] Assignee: The Kendall Company, Boston, Mass.

[21] Appl. No.: 958,310

[22] Filed: Nov. 6, 1978

[51] Int. Cl.$^2$ .................. F16L 9/14; B65H 81/00
[52] U.S. Cl. .................... 138/143; 138/144; 138/145; 156/150; 156/187; 427/29; 427/195; 428/36
[58] Field of Search .......... 428/36, 215, 416, 414; 427/29, 195; 156/187, 150, 188, 195; 138/144, 145, 143

[56] References Cited

U.S. PATENT DOCUMENTS

| | | | |
|---|---|---|---|
| 3,390,704 | 7/1968 | Woodell | 138/145 |
| 3,508,946 | 4/1970 | Plueddemann et al. | 428/36 |
| 3,578,615 | 5/1971 | Moore et al. | 528/88 |
| 3,687,765 | 8/1972 | MacLean et al. | 156/188 |
| 3,874,418 | 4/1975 | Hielema | 138/144 |
| 3,904,346 | 9/1975 | Shaw et al. | 427/29 |
| 4,011,354 | 3/1977 | Drostholm et al. | 427/203 |
| 4,060,655 | 11/1977 | Johannes et al. | 428/36 |
| 4,062,710 | 12/1977 | Muckenheim | 156/187 |

*Primary Examiner*—William R. Dixon, Jr.
*Attorney, Agent, or Firm*—Norman Blumenkopf; Herbert S. Sylvester; Murray M. Grill

[57] ABSTRACT

Steel pipe is provided with an external protective coating by first applying a corrosion protective coating of fused powdered epoxy resin adhered to the pipe, then applying (e.g. as by wrapping a sheet) an outer polyolefin layer directly onto the corrosion protective coating. The outer sheet of polyolefin is provided with a pressure-sensitive adhesive or a hot melt adhesive which adhesive may also be reactive with the epoxy coating (e.g. one having free carboxyl group such as ethylene acrylic acid copolymer). The polyolefin is preferably polyethylene or polypropylene and most preferably polyethylene. Either high or low density polyolefin may be used.

16 Claims, No Drawings

COATED PIPE AND PROCESS FOR MAKING SAME

BACKGROUND OF THE INVENTION

The coating of steel pipe used in the construction of pipe lines for carrying gas or oil may be carried out "over-the-ditch" or may be "plant-applied". Clearly, the major difference lies in the higher quality of the finished product made in plant and a major factor in this higher quality is in the higher quality of the cleaning and preparation of the pipe surface. It is, of course, also obvious that the in-plant equipment is generally more sophisticated and operational conditions more controllable leading to a better product as well. Theoretically, what can be done in-plant can also be done over-the-ditch, but, practically, this is not usually the case.

There are four major categories of presently used anti-corrosion external coatings for pipe-line pipe. These are (1) Hot Applied coal-tar enamel and asphalt mastics in relatively thick layers (100 mils) and commonly reinforced on the outside with glass or asbestos sheets. While such coatings are reported to represent over half of the plant-applied coatings in the United States, the hazards presented by their use foretell a decreasing popularity of this category. Further, the products show poor impact resistance, poor resistance to mechanical penetration, poor abrasion resistance, poor stability to soil stress conditions, and are only deemed fair in regard to indentation resistance, pipe bending, cathodic disbonding and resistance to hydrocarbon solvents.

(2) Extrusion coatings of a thermoplastic resin: (typically 40 mils). In practice, polyethylene has virtually a monopoly in this area. The technique may involve a seamless tubular extrusion over the pipe or a flat die sheet extrusion wrapped over the pipe. In most cases, the polymer is applied to a first-applied mastic layer (e.g. bituminous). These coatings show improved properties in regard to those mentioned above for the Hot-Applied enamel and coal tar coatings except insofar as resistance to hydrocarbon solvents.

(3) Tape Coating System (typically 20 to 80 mils). This technique was developed, inter alia, to provide an improved and viable over-the-ditch method but it is, of course, a fine system for in-plant use as well. A corrosion protection type tape is spirally wrapped around a rubbed-based primer coating (previously applied) and a second plastic outer wrap tape may then applied. The tapes are generally polyethylene backings with a pressure-sensitive solvent, or primer-activated adhesive coating thereon. The properties exhibited by pipe coated by this system are similar to those of the extrusion coated pipes.

(4) Fusion-bonded coatings—A thermoplastic powder is electrostatically applied to hot pipe where it "melts", adheres to the metal and fuses to itself. Only three basic materials have been widely used—polyethylene, vinyl and epoxy powders with only the latter enjoying commercial success in the United States. Chemically, these are, generally, bis-phenol A polymers with epoxy end groups.

The epoxys require a thermal curing to the thermoset form and usually a catalyst is used in the system (e.g. amines, acids, boron halides, etc.). Often times a liquid epoxy primer is used prior to the powder coating. Typically epoxy coatings have been 12-14 mils in thickness to provide at least acceptable resistance to cathodic disbonding, although in M. D. Simpson's paper "External Protection of Steel Pipes Using Epoxy Powder Coatings" (contribution SI) presented at the Second International Conference on the Internal and External Protection of Pipes (in England Sept. 1977) he states (page X2)

"Bitumen coal tar and polyethylene are required to be applied relatively thick, but epoxy powder coatings give excellent protection with only 3 mm of coating."

Apparently and obviously "3 mm" should be —0.3 MM— (12 mils) nevertheless, this value (i.e. 0.3 MM) still represents a relatively thick coating and its attendant disadvantages, e.g. brittleness and lack of flexibility and stresses at the pipe-epoxy interface.

In order to effect a satisfactory epoxy coating which would have satisfactory resistance to impact, mechanical penetration, indentation, abrasion, soil stresses, and cathodic disbondment it has been accepted that about a 12-14 mil thickness coating is required.

Some patents relating to the application of wrapping of thermoplastic material on pipe are U.S. Pat. Nos. 3,616,006 to Landgrof; 3,687,765 to MacLean et al; 3,802,908 to Emmons and 3,823,045 to Hielema. Extrusion coating of pipe is taught in Colombo U.S. Pat. No. 2,820,249. Epoxy coatings are described in U.S. Pat. Nos. 4,060,655; 3,578,615; 3,508,946; and 3,258,032. All of these patents are incorporated herein by reference thereto.

THE PRESENT INVENTION

The present invention relates to improved externally-coated pipe and, particularly to providing steel pipe with a corrosion-protective coating having a first epoxy coating and a second wrapped-tape outer layer, the latter being generally polyolefinic based, preferably polyethylene, carrying a layer means for effecting bonding to the epoxy layer. The said means may be a hot melt adhesive (i.e. one wherein adhesiveness is activated by elevated temperatures) or a pressure-sensitive adhesive.

The unique products of this invention comprise a steel pipe substrate, an epoxy coating of from 2 to 10 mils, preferably 2-8 mils, and more preferably 4-6 mils, and a flexible tape outerwrap, generally spirally applied to the epoxy coating, which carries adhesive bonding means for bonding to the epoxy coating. The tape outerwrap may vary from 4 to about 50 mils so that the total coating thickness is from 6 mils to about 50 mils and preferably 12 to 50 mils.

While, on the one hand, epoxy coatings of less than about 12 to 14 mils are not generally acceptable as coatings for pipes, and particularly large diameter pipes for use in subterrenean pipe lines for conveying gas oil or other chemicals, due as pointed out above, to many, far from desirable, properties and particularly poor resistance to cathodic disbonding, poor impact resistance, poor resistance to mechanical penetration, etc. and on the other hand, coatings of 12 to 14 mils and greater are contraindicated because of increased lack of flexibility, increased brittleness and interface stresses due to the cooling of the epoxy on the pipe, it has now been found that the aforestated benefits of an epoxy coating can be maintained and even improved, and their deficiencies minimized by employing a thinner epoxy coating in combination with a wrapped tape.

Applying a tape wrapping to a 12 to 14 mil epoxy coating, while possibly adding some benefits, does not solve the problems of epoxy coating brittleness and pipe-epoxy interface stress, and furthermore such a system would not be economically feasible.

The overall process for producing the products of this invention involves providing pipe, which has been suitably prepared for coating (i.e. cleaned, etc.) and which pipe is at an elevated temperature sufficient to form the epoxy coating. The pipe preparation is done in any of the conventional ways known in the art such as by shot and grit blasting. See, for example U.S. Pat. No. 3,371,806 to Anderson. The pipe is then conveyed to any suitable means (e.g. oven) to heat the pipe to a selected temperature. Generally, the chosen temperatures will be in the range of about 300° to 600° F. preferably 400° to 575° F. The temperature of the pipe must be high enough to fuse the epoxy powder which is electrostatically applied, and effect a curing within 1 to 4 minutes. Preferably the temperature of the pipe should be at least 25° F. higher than the fusion point of the Epoxy resin powder. Thereafter the Epoxy resin mix is electrostatically applied by conventional means to form a fused coating thickness of 2 to 10 mils, preferably 2 to 8 mils and more preferably 4 to 6 mils. The epoxy powder mix comprises the powdered epoxy resin, and generally one or more of a curing agent, accelerator, pigment, filler and control agent. Suitable and typical epoxy compositions are disclosed in U.S. Pat. No. 4,060,655 and the entire disclosure thereof is herewith incorporated by reference thereto. In order to effect a satisfactory epoxy coating, the powder mix must fuse (melt) and wet the pipe. This stage of melting and wetting but before "setting" is the "gel" stage of the resin. Suitable "gel" times are about 5 to 35 seconds and preferably about 10–30 seconds and more preferably about 15 to 30 seconds. The gel time must be sufficient for the coating to adequately "wet" the pipe surface for satisfactory adherence and bonding before complete curing of the resin to the fully thermo-set stage occurs. After complete curing which occurs in from about 1 to 4 minutes, and preferably in about 2 to 3 minutes, the tape outerwrap is applied, generally spirally by conventional techniques (See, for example U.S. Pat. Nos. 1,988,628; 3,687,765 and 3,874,418). The tape may be a pressure-sensitive adhesive coated polyolefin substrate such as, for example, a polyethylene substrate of 9 mils with a 4 mil butyl rubber adhesive on one surface thereof. The tape is, of course, applied to the cured epoxy layer with the adhesive layer in contact with the epoxy one. Usually, the epoxy coated pipe is cooled to below about 200°, preferably below about 150°, and most preferably below about 100° before applying the tape. Depending upon the nature of the pressure-sensitive adhesive, the pipe may be cooled far below sub-freezing temperatures, as one might encounter in the arctic (e.g. about −50° C.) since suitable adhesives for use at these temperatures are well-known and available. It is, however, preferable when using pressure sensitive adhesives to apply the tape to the coated pipe while the pipe is above ambient temperatures to effect an improved bonding. The particular temperature of the epoxy-coated pipe at the tape-applying stage is, obviously, not critical except insofar as it does not degrade or in any other manner adversely affect the tape and its bond to the epoxy coating. Cooling methods which may be used include, illustratively, air and water. Where the tape carries a hot-melt adhesive, the temperature of the pipe must be at least above the activation temperature of the adhesive and in such instances, generally ambient pipe temperatures would not be suitable. Where the adhesive contains groups reactive with the epoxy coating, whether the adhesive be hot-melt or pressure-sensitive, the temperature of the epoxy coating should be sufficient to insure such reaction whereby better bonding of the tape to the epoxy coating will result.

The tapes for use in this invention are made by conventional techniques as by calendering the adhesive mass on to the substrate (which may be a cast, calendered or extruded sheet), by extruding the adhesive onto the substrate or by coextruding the substrate and adhesive. All of such methods are well-known in the tape art.

The following examples will serve to illustrate the present invention without being deemed limitative thereof in any way whatsoever.

EXAMPLE 1

An eight foot length of 10 inch pipe after cleaning with sand blasting and being preheated to 460° F. by passing through an oven is conveyed and rotated to an electrostatic spray coating station where a powdered epoxy composition is applied, while the pipe is moving along and rotated, to a continuous fused coating thickness of 6 mils. The epoxy coating composition used is described in Example 16 of U.S. Pat. No. 3,508,946. The coated pipe is then conveyed to a water-quenching station to cool the coated pipe to about 150° F. The time for the pipe to traverse the distance from the epoxy spray station to the cooling station is two minutes which results in the curing of the epoxy coating. After quenching, the pipe emerges with a cured and dry epoxy coating of 6 mils, and while the pipe is still at about 150° F. a high density-polyethylene backed tape (4 mils) carrying a pressure sensitive butyl adhesive (2 mils) is spirally applied with overlap at the joints. The resultant epoxy-coated and tape-wrapped pipe exhibits the beneficial characteristics of a 12 mil epoxy coating and, in addition, shows improved cathodic disbondment properties, less damage to the composite protection layer upon handling and very good resistance to weathering and water penetration, whereas a 12 mil epoxy coating along is only fair in its imperviousness to moisture, water and salts and such a coating (i.e. 12 mil epoxy alone) will eventually soften and can be readily mechanically debonded from the pipe.

EXAMPLE 2

Example 1 is repeated except that the epoxy resin coating used is that described in Example 1 of U.S. Pat. No. 4,060,655 and the pipe is preheated to 525° F. Excellent results are obtained.

EXAMPLE 3

Example 1 is again repeated except that the tape outerwrap is a high density polyethylene (6 mil).

EXAMPLE 4

Example 3 is repeated except that the outerwrap is applied at a station intermediate the epoxy-coating station and the water quenching station, one minute downstream from the epoxy coating station. An outstanding product is produced.

EXAMPLE 5

Example 2 is repeated except that the outerwrap is applied as in Example 4 (coated pipe surface temperature about 350° F.) and the adhesive is an ethylene-acrylic acid copolymer containing 8% acrylic acid and having a melt index of 5.5 (DOW EAA 455).

What is claimed is:

1. A coated article comprising a metallic pipe having a protection layer thereon, said layer comprising a first layer bonded to the pipe of an epoxy coating derived from a bis-phenol A polymer of 2 to 10 mils and an adhesive faced thermoplastic polymer tape wrapping adhesively bonded to said epoxy coating, said protection layer being from 6 to about 50 mils in thickness.

2. An article as set forth in claim 1 wherein the pipe is steel.

3. An article as set forth in claim 2 wherein the tape polymer is polyethylene.

4. An article as set forth in claim 3 wherein the thickness of the protection layer is from 12 to 50 mils.

5. An article as set forth in claim 4 wherein the adhesive is a pressure-sensitive adhesive.

6. An article as set forth in claim 4 wherein the adhesive is a heat-activated polymer.

7. An article as set forth in claim 6 wherein the heat-activated polymer is chemically bonded to said epoxy coating.

8. An article as set forth in claim 7 wherein the heat-activated polymer is an ethylene-acrylic acid interpolymer.

9. An article as set forth in claim 1 wherein the epoxy coating is derived from a bis-phenol A polymer having terminal epoxy groups, a gel period of about 5 to about 35 seconds at 250° C. and a cure period of about 1 to 4 minutes.

10. An article as set forth in claim 5 wherein the adhesive is a butyl adhesive.

11. A process for externally protecting metal pipe which comprises providing heated pipe, electrostatically applying fusible Epoxy resin powder derived from a bis-phenol A polymer to the exterior surface of the metal to form a continuous coating of from 2 to 10 mils in thickness and thereafter spirally wrapping an adhesive-faced flexible thermoplastic polymer substrate so that the thickness of the epoxy coating and tape wrapping is from 6 to 50 mils.

12. A process as set forth in claim 11 wherein the Epoxy powder has a gel time of from about 5 to about 35 seconds and a cure time of about 1 to 4 minutes at 250° C.

13. A process as defined in claim 12 wherein the temperature of the pipe is at least 25° F. above the fusion temperature of the epoxy resin.

14. A process as defined in claim 13 wherein the flexible substrate is polyethylene and the adhesive facing is a butyl-based adhesive.

15. A process as defined in claim 14 wherein the total coating thickness is from 12 to 50 mils.

16. A process as defined in claim 13, wherein the flexible substrate is polyethylene and the adhesive facing is a heat-activatable ethylene-acrylic acid hot melt adhesive.

* * * * *